Dec. 6, 1966 J. M. MUSGRAVE 3,290,467
FLOAT SWITCH FOR INDICATING BRAKE FLUID LEVEL HAVING AN ANNULAR
PORTION FOR RECEIVING MERCURY WHEN THE SWITCH IS
DISPOSED UPSIDE DOWN

Filed April 7, 1965 2 Sheets-Sheet 1

INVENTOR.
JOHN M. MUSGRAVE
BY *[signature]*
Agent

Dec. 6, 1966   J. M. MUSGRAVE   3,290,467
FLOAT SWITCH FOR INDICATING BRAKE FLUID LEVEL HAVING AN ANNULAR
PORTION FOR RECEIVING MERCURY WHEN THE SWITCH IS
DISPOSED UPSIDE DOWN
Filed April 7, 1965                                        2 Sheets-Sheet 2
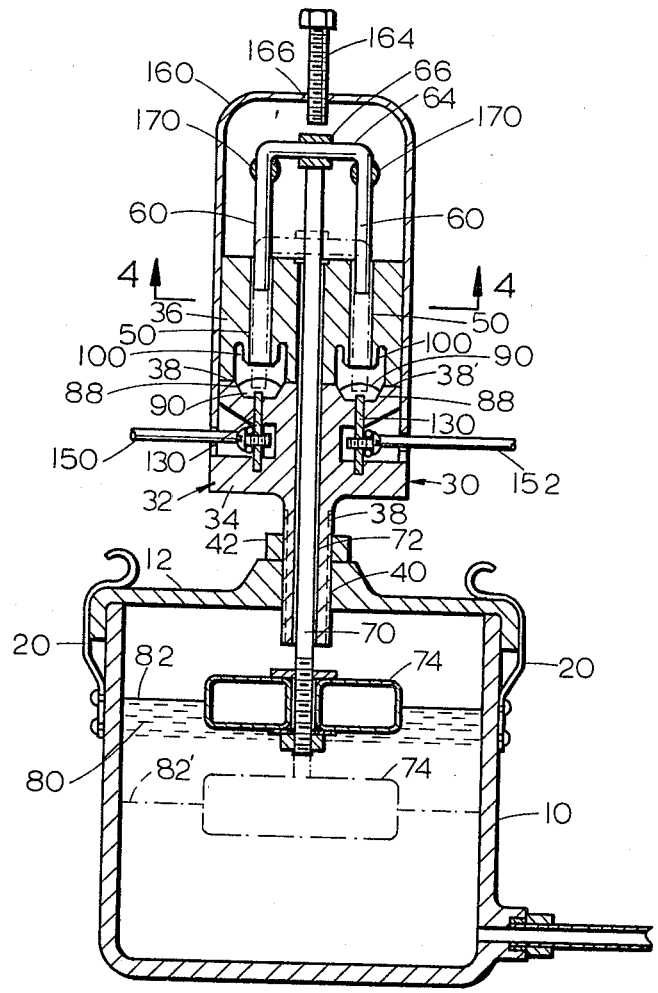
FIG. 3
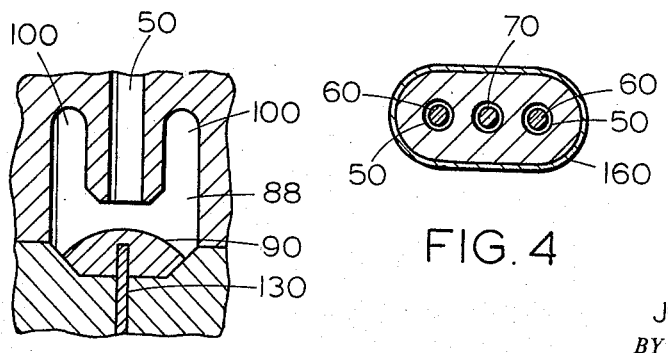
FIG. 4
FIG. 5
INVENTOR.
JOHN M. MUSGRAVE 3,290,467
FLOAT SWITCH FOR INDICATING BRAKE FLUID LEVEL HAVING AN ANNULAR PORTION FOR RECEIVING MERCURY WHEN THE SWITCH IS DISPOSED UPSIDE DOWN
John M. Musgrave, Woodbine, Iowa
Filed Apr. 7, 1965, Ser. No. 446,211
3 Claims. (Cl. 200—84)

This invention relates to brake fluid level indicators and more particularly it is an object of this invention to provide a brake fluid level indicator which does not depend in its switching upon the engagement of solid contact points.

More particularly it is an object of this invention to provide a brake fluid level indicator having a switch which utilizes mercury or other liquid electrical conductor for making electrical contact in order to avoid disadvantages of switches of the prior art having solid contact points which tend to work for only a limited time before becoming corroded and burned, whereupon they cease to function dependably.

Another object is to provide a brake fluid level indicator, the contact in which avoids the disadvantage experienced in the prior art when dust comes between the contact points of a switch preventing its proper operation.

A further disadvantage of solid contact points eliminated in this invention is the problem that contact points large enough to insure contact over a substantial period of time have a sufficient weight because of their large size, this being a weight which is too great to be raised by a float in a brake fluid level cylinder since the amount of room available for a float in a brake fluid level cylinder is limited.

A particular object of the invention is to provide a switch carrying mercury which particularly designed so that the mercury tends to return to its position for operation after the switch has been turned upside down and then rightside up again because of the provision in the switch of an annular well for receiving the mercury at times when the switch is disposed upside down.

A further object of the invention is to provide means for holding moving parts of the switch portions thereof in a fixed position during shipment.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 3 is a sectional view taken along the line 3—3 of FIGURE 2.

FIGURE 4 is a sectional view taken along the line 4—4 of FIGURE 3.

FIGURE 5 is a detail showing a section of the switch adjacent the conductive fluid-containing chamber thereof.

Figure 1:
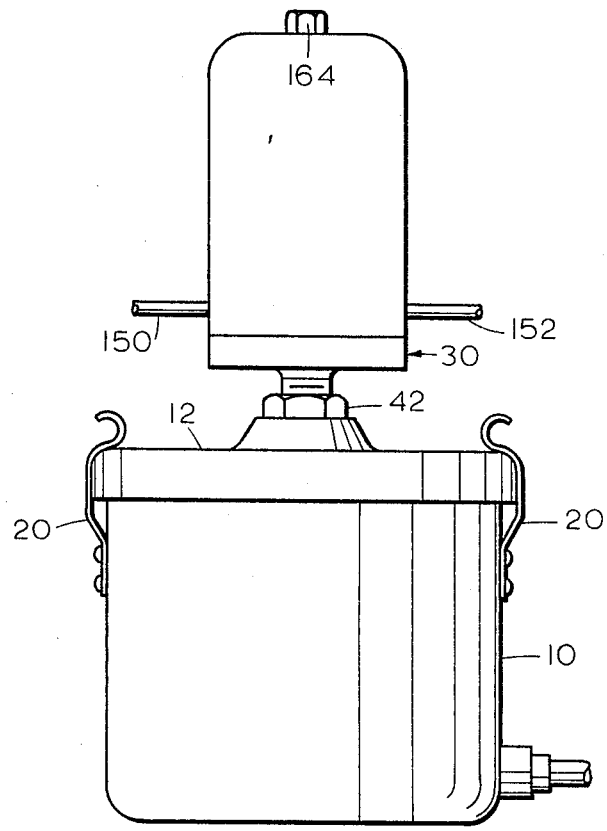
FIGURE 1 is a side elevation of a brake fluid level master cylinder showing the float switch of this invention attached thereto.
Figure 2:
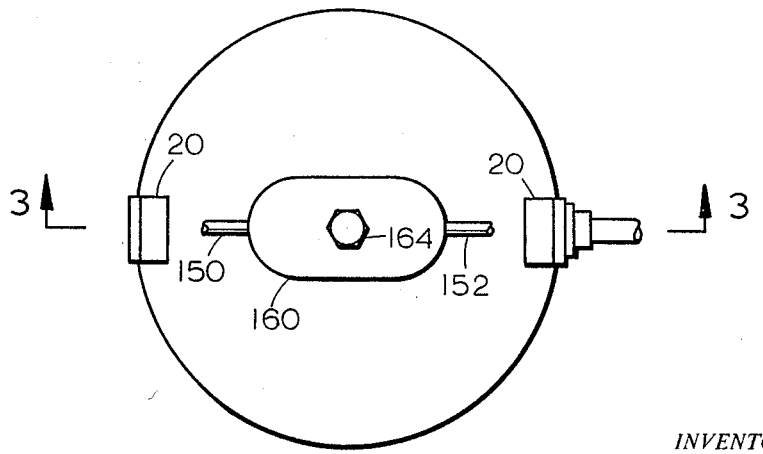
FIGURE 2 is a top plan view of the parts shown in FIGURE 1.

Referring to FIGURE 1, the brake master cylinder is there shown at 10 with a top 12 held in place by any suitable fashion such as metal clips 20 or other conventional means, it being understood that the particular manner in which the cover 12 is secured to the remainder of the master cylinder 10 is immaterial.

In accordance with this invention, a float switch generally indicated at 30 is mounted on the cover 12 and the float switch 30 has a body generally indicated at 32 having a lower section 34 and an upper section 36 which are suitably secured together such as by cement along a line 38′, best seen in FIGURE 3. The lower body portion 34 has a downwardly extending shank 38 which is threaded on its outer side and which is received threadedly in a threaded opening 40 extending vertically through the cover 12, a nut 42 received on the shank 38 preventing the shank 38 from rotation by its engagement with the cover 12.

The body portion 36 has a pair of spaced apart contact wire-receiving recesses 50 extending downwardly therethrough from the upper end, and the recesses 50 can also be called contact wire-receiving passages and their purpose is to receive slidably therein a pair of contact wires 60 which extend into and sometimes through the passages 50 from an upper cross bar 64 which interconnects them, the cross bar 64 having a non-conductive element 66 disposed about it midway between the contact wires 60, the element 66 being supported on an elongated vertical float rod 70 which extends down to a float 74 to which it is suitably connected, the float 74 riding in the upper portion of brake fluid 80, the upper level of which is shown at 82 in FIGURE 3.

The switch body 32 has a pair of conductive material chambers 88 at spaced apart points in it, the chambers 88 being in communication with the passages 50 and the chambers 88 receiving in the lower portions thereof a conductive fluid 90 which is of any suitable type, especially one that does not evaporate or freeze and mercury or sulphuric acid are suitable. The chambers 88 have annular portions 100 which completely surround the lower ends of, and are spaced from the lower ends of the passages 50, whereby annular portions of the upper portion 36 of the body 32 are disposed between the annular portions 100 of the chambers 88 and the respective passages 50. The annular portions 100 can also be called conductive fluid-receiving wells.

Two stationary contact points 130 extend through the body 32 and protrude into lower ends of the conductive material chambers 88 making contact with the mercury or conductive fluid 90. Wires 150 and 152 lead from the contact point 130 to a signal element, not shown, which latter can be a light disposed on the dashboard of an automobile containing the master cylinder, or it can be an audible signal such as a buzzer, or both.

In operation, it will be seen that as the fluid level 82 moves downwardly to the dotted line position 82′, shown in FIGURE 3, the float 74 will likewise move downwardly causing the float rod 70 to cease to uphold the cross bar 64, whereby the contact wires 60 then move downwardly until they reach the dotted line position shown in FIGURE 3 in which they contact the mercury 90 completing a circuit between the wires 150 and 152 and causing the dashboard signal to function warning a driver of low brake fluid level.

A cap 160 of an inverted cup-shape is disposed over the top of the body 32 and fits it closely on all sides.

At the upper end of the cap 160 is a screw 164 threadedly disposed through an opening 166 in the cap 160, whereby the screw 164 can be extended inwardly of the cap 160 so as to press on the member 66 sufficiently to force resilient gaskets 170 which surround the upper ends of the contact wires 60 into tight engagement with the switch body 32 at the upper ends of the passages 50, whereby the passages are sealed, the gaskets 170 being firmly fixed on the switch wires 60.

With the screw 164 in the lower position, the passages 50 are sealed and the moving parts of the pressure switch are prevented from movement as is desirable during shipment and also to prevent any mercury from escaping through the passages 50.

As thus described, this invention is believed to have fulfilled the objectives above set forth and particularly inasmuch as the conductive fluid will make a firm contact that remains effective over a longer period for efficient operation, dependable for safety in emergency.

From the foregoing description, it is thought to be obvious that a brake fluid indicator constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

1. A float switch having a body member, a switch rod bore extending upwardly through said body member from a lower end, a float rod extending upwardly through said bore, two contact wire passages in said body member, two contact wires movable in said contact wire passages, means extending through said body member and movable upwardly and downwardly with respect to said body member and interconnecting said contact wires conductively and operatively correlated with said float rod for simultaneous movement upwardly and downwardly in unison therewith, a pair of conductive material chambers in said body member and disposed below said contact wire passages and in communication therewith, conductive fluid material disposed in said chambers respectively, contacts extending through said body member and through the walls of said chambers in portions thereof normally containing said conductive fluid, a float on the lower end of said float rod, whereby when said float moves upwardly and downwardly said contact wires will move out of contact and into contact with the conductive fluid in said chambers respectively for opening and closing electrical communication between said contact points, and in which each of said chambers has an upper wall provided with an annular recess extending horizontally around and spaced from the lower end of a respective one of said contact wire passages, said annular recesses being large enough to receive said conductive fluid at times when said switch is turned upside down.

2. The combination of claim 1 further in which said contact wire passages extend through the upper end of said body member and in which said contact wires likewise extend through the upper end of said body member, and gasket means surrounding said contact wires and portions thereof disposed upwardly from said body member in positions such as not to interfere with downward movement of said contact wires into contact with said conductive fluid and in positions such that said gasket means tend to engage said body member for sealing the upper ends of said passages at times when said contacts are disposed sufficiently far into said body member.

3. The combination of claim 1 further in which a cap is provided of an inverted cup-shape which tightly engages and surrounds the outer sides of said body member with the upper portion of said cap receiving said means interconnecting said contact wires, and a bolt means threadedly extended through the upper end of said cap and adapted to be screwed downwardly into a position for forcing said connection means downwardly, and said connection means being substantially rigid whereby at times when said set screw is in a lower position said connection means will dispose said wires in position for causing their gaskets to seal openings in said passages.

References Cited by the Examiner

UNITED STATES PATENTS 1,776,287    9/1930    Johnstone _____ 200—84

FOREIGN PATENTS 656,557    6/1928    France.

BERNARD A. GILHEANY, *Primary Examiner.*

H. A. LEWITTER, *Assistant Examiner.*